US011948717B2

(12) United States Patent
Shinohara et al.

(10) Patent No.: US 11,948,717 B2
(45) Date of Patent: Apr. 2, 2024

(54) COIL DEVICE

(71) Applicant: TDK CORPORATION, Tokyo (JP)

(72) Inventors: Ryoei Shinohara, Tokyo (JP); Takashi Arasawa, Tokyo (JP); Yoshihiro Kawasaki, Tokyo (JP); Munehito Nishimura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 449 days.

(21) Appl. No.: 17/002,094

(22) Filed: Aug. 25, 2020

(65) Prior Publication Data

US 2021/0065960 A1 Mar. 4, 2021

(30) Foreign Application Priority Data

Aug. 30, 2019 (JP) ................................ 2019-159038

(51) Int. Cl.

*H01F 17/04* (2006.01)
*H01F 27/24* (2006.01)
*H01F 27/26* (2006.01)
*H01F 27/29* (2006.01)
*H01F 41/02* (2006.01)
*H01F 41/04* (2006.01)
*H01F 1/34* (2006.01)

(52) U.S. Cl.

CPC ........... *H01F 27/24* (2013.01); *H01F 17/045* (2013.01); *H01F 27/263* (2013.01); *H01F 27/29* (2013.01); *H01F 27/292* (2013.01); *H01F 41/0206* (2013.01); *H01F 41/04* (2013.01); *H01F 1/344* (2013.01)

(58) Field of Classification Search

CPC ....................................................... H01F 27/24
USPC .......................................................... 336/221
See application file for complete search history.

(56) References Cited

U.S. PATENT DOCUMENTS 6,242,996 B1 * 6/2001 Sato ...................... H01F 17/045 336/200
6,373,366 B1 * 4/2002 Sato ...................... H01F 27/292 336/200
2007/0063804 A1 * 3/2007 Watanabe ................ H01F 3/10 336/83
2007/0120758 A1 * 5/2007 Takahashi ................ H01Q 7/08 343/788

(Continued)

FOREIGN PATENT DOCUMENTS

JP 2002-329618 A 11/2002

*Primary Examiner* — Ronald Hinson
(74) *Attorney, Agent, or Firm* — Oliff PLC

(57) ABSTRACT

A coil device includes: a drum core having first and second flange portions and a winding core portion therebetween; a coil wound around the core portion; a plate core connected to first and second flange portions first and second flange surfaces at a first direction side; a first electrode terminal on the first flange portion, one coil end portion electrically connected on the first electrode terminal; and a second electrode terminal on the second flange portion, the other coil end portion electrically connected on the second electrode terminal. The plate core has a first and second projecting portions respectively protruding toward the first and second flange surfaces and having first and second flat surfaces facing the first and second flange surfaces. The drum core and the plate core are connected by abutting and bonding the first and second flange surfaces against the first and second flat surfaces.

4 Claims, 7 Drawing Sheets

(56) References Cited

U.S. PATENT DOCUMENTS

| | | | | |
|---|---|---|---|---|
| 2008/0224813 | A1* | 9/2008 | Hirai | H01F 17/045 336/216 |
| 2017/0025212 | A1* | 1/2017 | Jerez | H01F 41/0206 |
| 2017/0125151 | A1 | 5/2017 | Hamamura et al. | |
| 2017/0229227 | A1 | 8/2017 | Igarashi | |
| 2020/0105451 | A1* | 4/2020 | Horie | H01F 17/045 |

* cited by examiner

COIL DEVICE

BACKGROUND OF THE INVENTION

1. Field of the Invention

The present invention relates to a coil device that uses a core which is a combination of a plate core and a drum core.

2. Description of the Related Art

A coil device that uses a core which is a combination of a plate core and a drum core has been proposed as a surface-mountable chip-type coil device. The plate core is bonded with an adhesive or the like to a flange portion of the drum core. The plate core of the related art has a simple plate shape, is connected to two flange portions of the drum core, and forms a closed magnetic circuit together with the drum core (see JP 2002-329618 A).

SUMMARY OF THE INVENTION

However, in the core having the shape of the related art, a problematic decline in the bondability between the drum core and the plate core arises due to the material of the core or the like. For example, the bondability tends to decline in a case where the material of the plate core is not ferrite and the plate core is including metal particles, such as a metal core or an alloy core.

The invention has been made in view of such circumstances, and an object of the invention is to provide a coil device having satisfactory bondability between a plate core and a drum core.

In order to achieve the above object, a coil device according to the invention includes:

a drum core having a first flange portion, a second flange portion and a winding core portion disposed between the first and second flange portions;

a coil wound around the winding core portion;

a plate core connected to a first flange surface of the first flange portion at a first direction side and a second flange surface of the second flange portion at the first direction side;

a first electrode terminal provided on the first flange portion, one end portion of the coil being electrically connected on the first electrode terminal; and a second electrode terminal provided on the second flange portion, the other end portion of the coil being electrically connected on the second electrode terminal, wherein the plate core has a first projecting portion protruding toward the first flange surface and having a first flat surface facing the first flange surface and a second projecting portion protruding toward the second flange surface and having a second flat surface facing the second flange surface, and the drum core and the plate core are connected by abutting and bonding the first flange surface against the first flat surface and by abutting and bonding the second flange surface against the second flat surface.

The plate core of the coil device according to the invention has the first projecting portion and the second projecting portion. The plate core is bonded to the first flange portion and the second flange portion of the drum core by the first flat surface of the first projecting portion butting against the first flange surface and the second flat surface of the second projecting portion butting against the second flange surface.

By the plate core having the first projecting portion and the second projecting portion, a surface suitable for bonding is formed in the first projecting portion and the second projecting portion as compared with a flat plate core of the related art. Accordingly, in the coil device according to the invention, the plate core is bonded to the drum core via the first projecting portion and the second projecting portion, and thus the bondability between the plate core and the drum core is satisfactory.

In addition, for example, a length of the plate core may be shorter than a length of the drum core along a winding axis direction.

By the length of the plate core being shorter than the length of the drum core, an adhesive easily spreads to the part that is outside the first flat surface in the first projecting portion and the part that is outside the second flat surface in the second projecting portion, and thus the coil device has satisfactory bondability between the plate core and the drum core.

In addition, for example, a first cured-adhesive portion bonding the first flange surface and the first flat surface may be also in contact with a first wall surface extending from the first flat surface of the first projecting portion in a direction away from the first flange surface, and a second cured-adhesive portion bonding the second flange surface and the second flat surface may be also in contact with a second wall surface extending from the second flat surface of the second projecting portion in a direction away from the second flange surface.

The first wall surface in the first projecting portion and the second wall surface in the second projecting portion have a surface denser than the first flat surface and the second flat surface and are satisfactorily bondable to the adhesive. Accordingly, by the cured-adhesive portion being in contact with the first wall surface and the second wall surface, the coil device is capable of improving the bondability between the plate core and the drum core.

In addition, for example, the first wall surface may have a first inner wall surface extending from the first flat surface at a side close to the second flat surface and the first cured-adhesive portion is in contact with the first inner wall surface, and the second wall surface may have a second inner wall surface extending from the second flat surface at a side close to the first flat surface and the second cured-adhesive portion is in contact with the second inner wall surface.

The first inner wall surface and the second inner wall surface are wall surfaces positioned on the central recessed portion side of the first projecting portion and the second projecting portion, and the wall surfaces in particular tend to form a dense surface in the first projecting portion and the second projecting portion. Accordingly, in the coil device in which the cured-adhesive portion is in contact with the first inner wall surface and the second inner wall surface, the bondability between the plate core and the drum core can be effectively improved. In addition, in the coil device, the cured-adhesive portion spreads to the center side of the plate core with respect to the first projecting portion and the second projecting portion, and thus the external dimension of the coil device is not affected even in the event of adhesion area expansion to such a part. Accordingly, the coil device has little external dimensional manufacturing deviation and it is possible to realize the coil device in which the bondability between the plate core and the drum core is satisfactory.

In addition, for example, the first wall surface may have a first outer wall surface extending from the first flat surface at a side far from the second flat surface and the first cured-adhesive portion is in contact with the first outer wall surface, and the second wall surface may have a second outer wall surface extending from the second flat surface at a side far from the first flat surface and the second cured-adhesive portion is in contact with the second outer wall surface.

The first outer wall surface and the second outer wall surface are wall surfaces positioned outside the first flat surface and the second flat surface in the first projecting portion and the second projecting portion. The wall surfaces tend to form a surface denser than the first flat surface and the second flat surface. Accordingly, in the coil device in which the cured-adhesive portion is in contact with the first outer wall surface and the second outer wall surface, the bondability between the plate core and the drum core can be effectively improved. In addition, in the coil device in which the cured-adhesive portion is in contact with the first outer wall surface and the second outer wall surface, both end portions of the plate core or the surroundings thereof can be coated with an adhesive, and thus the bondability between the plate core and the drum core is satisfactory.

In addition, for example, the plate core may be including metal particles.

The surface tends to be rougher in a case where the plate core is including metal particles, such as a metal core or an alloy core than in a case where the plate core is a ferrite core. However, even such a plate core has satisfactory bondability with respect to the drum core by having the first projecting portion and the second projecting portion.

In addition, for example, the drum core may be a ferrite core.

In the case of the shape according to the related art, a decline in bondability tends to arise in a case where a metal plate core and a ferrite drum core are bonded. However, the coil device is satisfactory in terms of the bondability between the plate core and the drum core by the plate core having the first projecting portion and the second projecting portion.

DETAILED DESCRIPTION OF THE PREFERRED EMBODIMENTS

Figure 1:
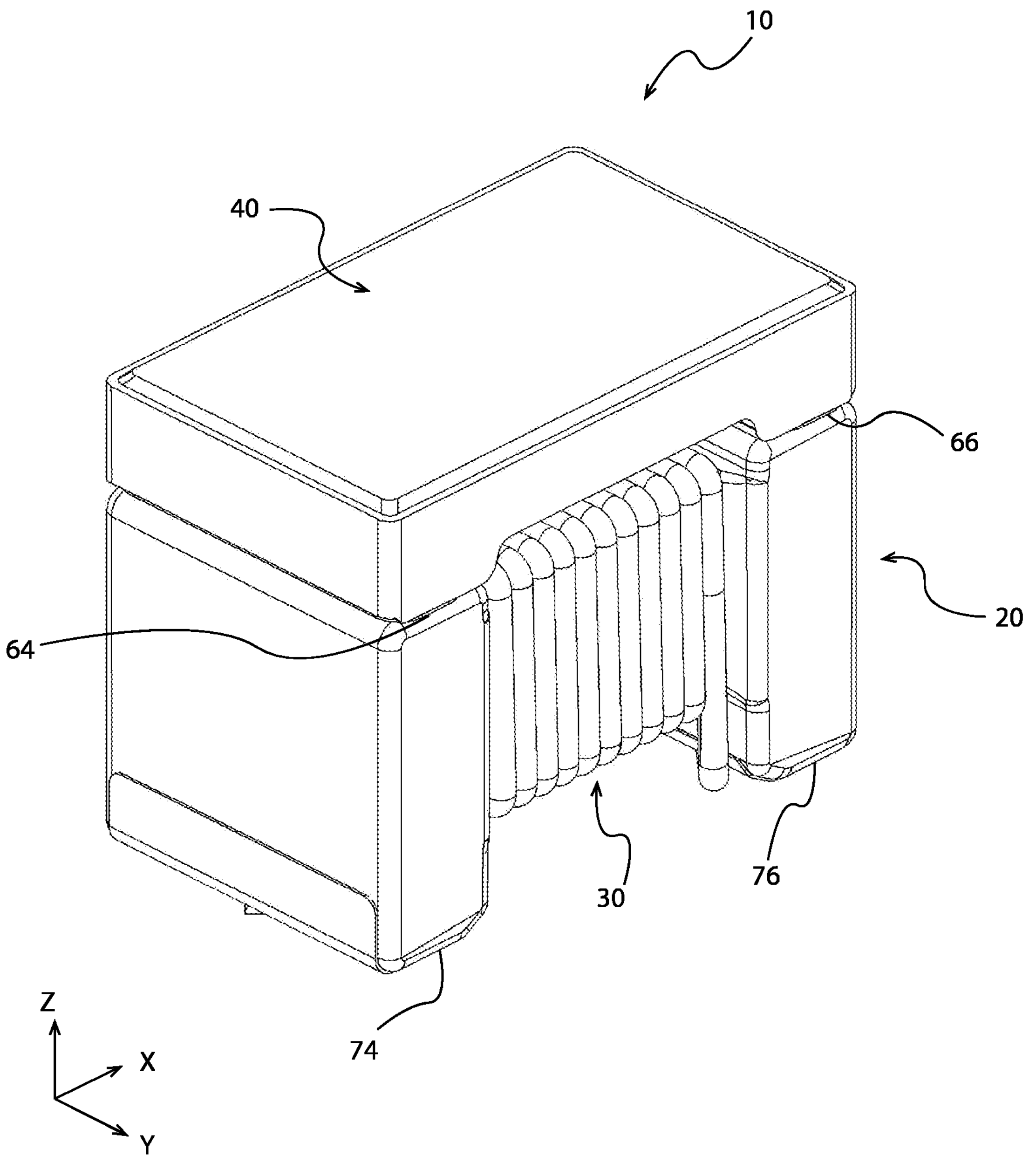
FIG. 1 is a perspective view of a coil device according to an embodiment of the invention.

FIG. 1 is a perspective view in which a coil device 10 according to an embodiment of the invention is seen obliquely from above. The coil device 10 has a drum core 20, a coil 30, a plate core 40, a first electrode terminal 74, a second electrode terminal 76, and the like. The coil device 10 has a substantially rectangular parallelepiped outer shape. The coil device 10 is surface-mounted onto a mounting substrate by, for example, an adsorption nozzle of a mounting machine adsorbing, holding, and transporting the upper surface of the plate core 40. However, the coil device 10 is not limited to being surface-mounted.

Figure 2:
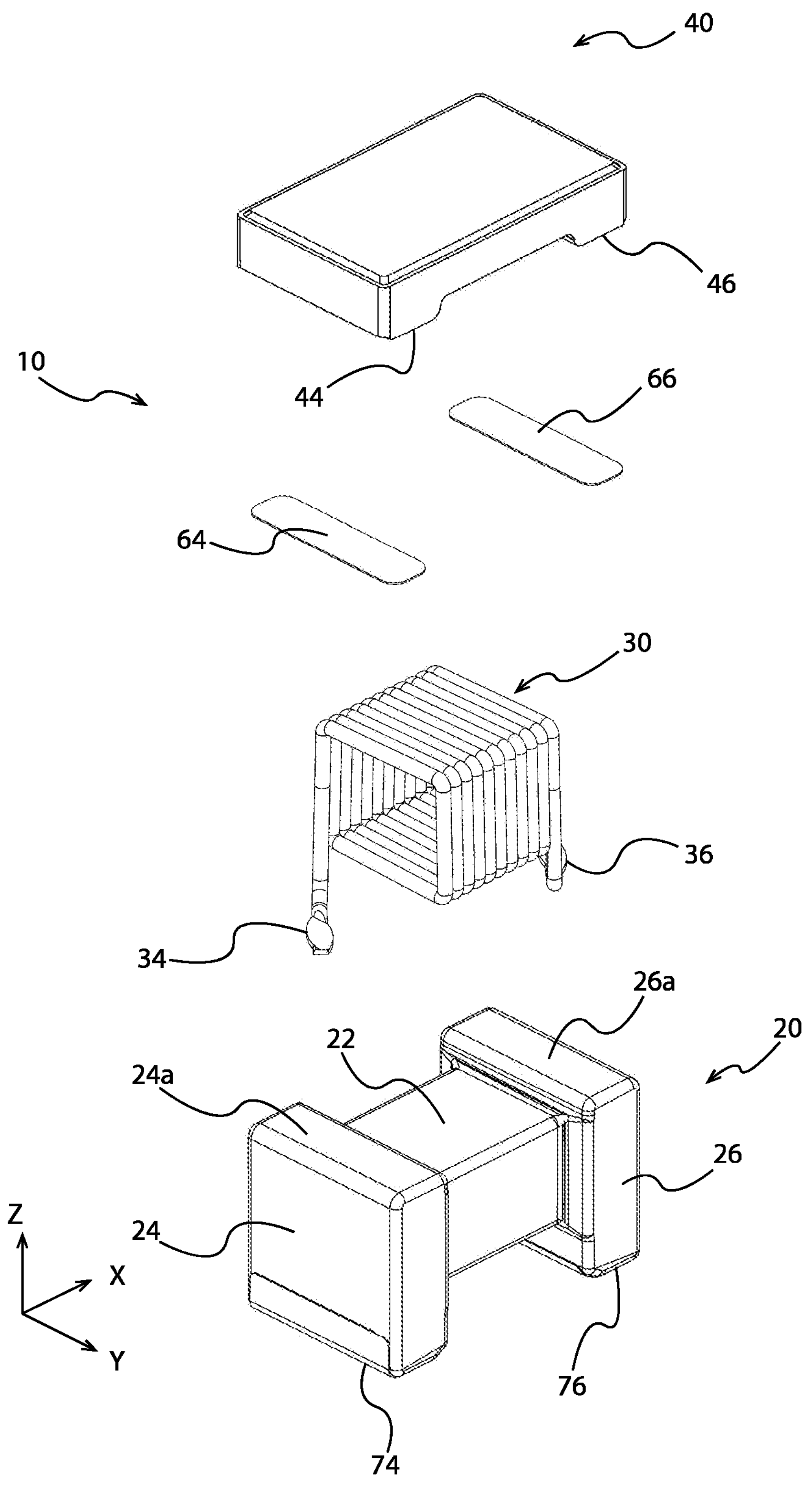
FIG. 2 is an exploded perspective view of the coil device illustrated in FIG. 1.

FIG. 2 is an exploded perspective view of the coil device 10 illustrated in FIG. 1. As illustrated in FIG. 2, the core of the coil device 10 is configured by the drum core 20 and the plate core 40 being bonded. The coil device 10 has a first cured-adhesive portion 64 and a second cured-adhesive portion 66, which are formed by the adhesive that bonds the plate core 40 and the drum core 20 being hardened.

Although examples of the adhesive that becomes the first cured-adhesive portion 64 and the second cured-adhesive portion 66 after the hardening include an epoxy-based adhesive, a non-epoxy-based adhesive may also be used. It should be noted that the shapes of the first cured-adhesive portion 64 and the second cured-adhesive portion 66 are schematically illustrated in FIG. 2. The shapes of the first cured-adhesive portion 64, the second cured-adhesive portion 66, and the surroundings of the first cured-adhesive portion 64 and the second cured-adhesive portion 66 will be described in detail later with reference to FIGS. 5 and 6.

As illustrated in FIG. 2, the drum core 20 has a winding core portion 22 and a first flange portion 24 and a second flange portion 26 disposed on both sides across the winding core portion 22. The coil 30 is wound around the winding core portion 22. It should be noted that the X-axis direction in the description of the coil device 10 is the winding axis direction of the coil 30, the Z-axis direction in the description is the direction in which the drum core 20 and the plate core 40 are bonded, and the Y-axis direction in the description is orthogonal to the X-axis direction and the Z-axis direction as illustrated in FIGS. 1 and 2.

Although the cross section of the winding core portion 22 that is orthogonal to the winding axis direction is rectangular, the cross-sectional shape of the winding core portion 22 is not limited thereto and may be a circular shape, an elliptical shape, or another shape. As in the case of the winding core portion 22, the cross sections of the first flange portion 24 and the second flange portion 26 that are orthogonal to the winding axis direction are rectangular. However, the first flange portion 24 and the second flange portion 26 are larger in cross-sectional area than the winding core portion 22 with regard to the cross sections orthogonal to the winding axis direction. The first flange portion 24 and the second flange portion 26 protrude with respect to the winding core portion 22 with regard to the direction that is orthogonal to the winding axis direction.

The outer shape of the plate core 40 is a substantially rectangular plate shape or a substantially rectangular parallelepiped shape. The plate core 40 is connected to the first flange portion 24 and the second flange portion 26 of the drum core 20. The plate core 40 is connected to a first flange surface 24*a* and a second flange surface 26*a*, which are surfaces of the first flange portion 24 and the second flange portion 26. The first flange surface 24*a* and the second flange surface 26*a* are on the Z-axis positive direction side, which is a first direction side. The shape of the plate core 40 will be described in detail later.

Figure 5:
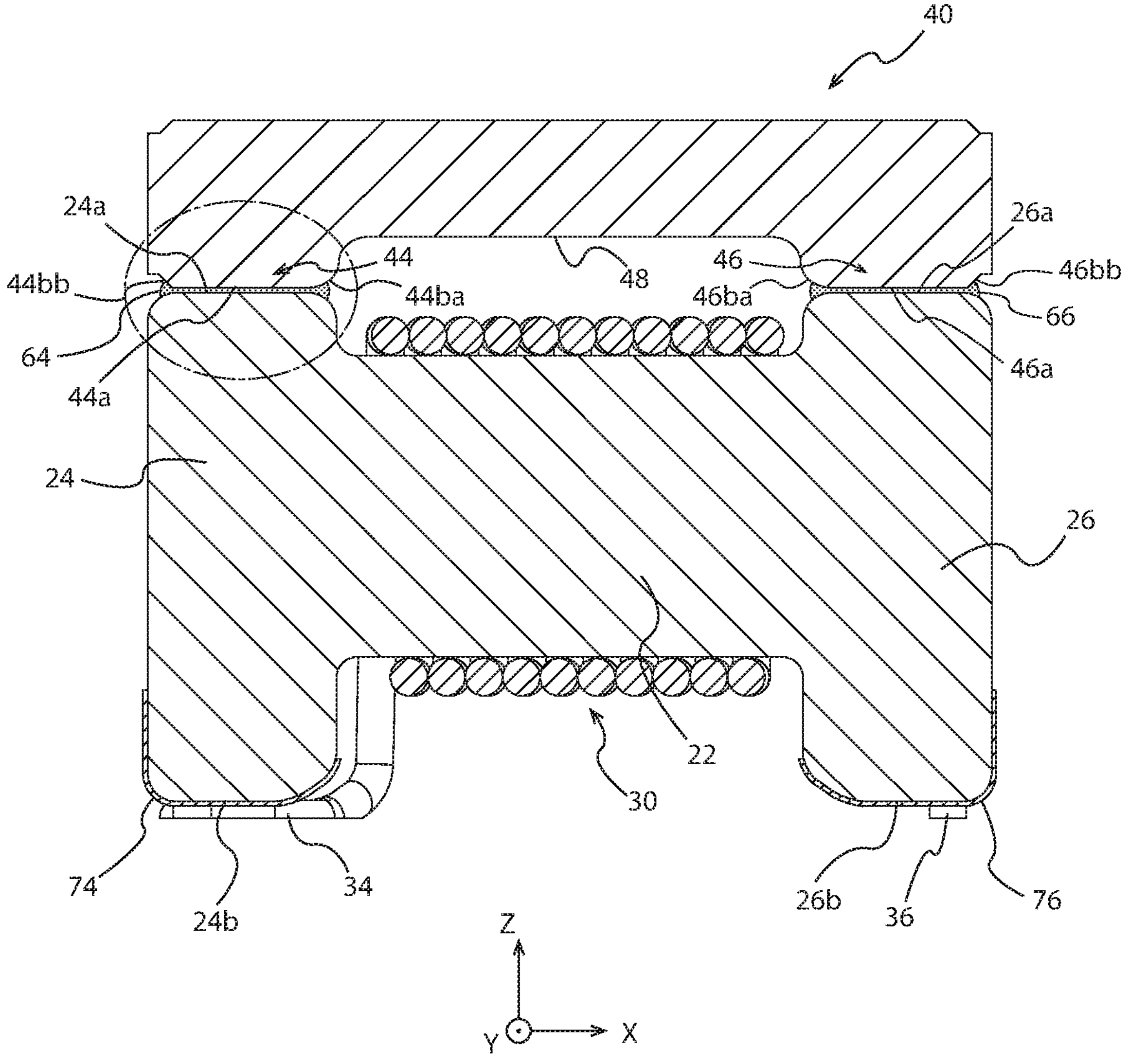
FIG. 5 is a cross-sectional view of the coil device illustrated in FIG. 1.

The first flange portion 24 is provided with the first electrode terminal 74 to which a first end portion 34, which is one end portion of the coil 30, is electrically connected. Although the first electrode terminal 74 is provided on a flange lower surface 24*b*, which is on the side that is opposite to the first flange surface 24*a*, as illustrated in FIG. 5, the installation position of the first electrode terminal 74 is not limited thereto. The first electrode terminal 74 may be provided so as to be continuous with another surface of the first flange portion 24 or a plurality of surfaces of the first flange portion 24.

The second flange portion 26 is provided with the second electrode terminal 76 to which a second end portion 36, which is the other end portion of the coil 30, is electrically connected. Although the second electrode terminal 76 is provided on a flange lower surface 26*b*, which is on the side that is opposite to the second flange surface 26*a*, as illustrated in FIG. 5, the installation position of the second electrode terminal 76 is not limited thereto. The second electrode terminal 76 may be provided so as to be continuous with another surface of the second flange portion 26 or a plurality of surfaces of the second flange portion 26.

The drum core 20 and the plate core 40 illustrated in FIG. 2 are made of, for example, a magnetic material. Although the drum core 20 and the plate core 40 may be made of the same type of material, the drum core 20 and the plate core 40 may also be made of different materials. In the coil device 10 according to the embodiment, the plate core 40 is a metal core or an alloy core such as pure iron and Fe—Ni, Fe—Si, Fe—Si—Al, and Fe—Si—Cr alloys.

The plate core 40 is made by, for example, soft magnetic metal powder being mixed with a binder or the like, formed, and fired. Since the plate core 40 is a metal core or an alloy core, the magnetic saturation characteristics of the coil device 10 can be improved. It should be noted that the soft magnetic metal particles contained in the plate core 40 preferably form an insulating film of an oxide such as chromium oxide and the plate core 40 has a high resistance value and is capable of reducing core loss although the plate core 40 is a metal core or an alloy core. Alternatively, the plate core 40 may be a ferrite core.

In the coil device 10 according to the embodiment, the drum core 20 is a ferrite core. However, the drum core 20 is not limited to the ferrite core and the drum core 20 may be a metal core or an alloy core as in the case of the plate core 40. The drum core 20 is obtained by, for example, a ferrite sintered body being made by means of ferrite powder such as Mn—Zn-based ferrite and Ni—Zn-based ferrite.

Since the drum core 20 is made of, for example, a ferrite formed body that does not substantially contain a binder, it is possible to prevent a problem such as void generation in the drum core 20. In addition, by the drum core 20 being a ferrite core, it is possible to realize a core having a high resistance value and reduce core loss. In addition, by the plate core 40 being a metal core or an alloy core and the drum core 20 being a ferrite core, it is possible to realize the coil device 10 having satisfactory magnetic saturation characteristics and little core loss.

The first electrode terminal 74 and the second electrode terminal 76 illustrated in FIG. 5, which is a cross-sectional view, are made by, for example, an electrode material such as Ag, Ni, and Sn being applied to the first flange portion 24 and the second flange portion 26 and baking or plating-based film formation being performed. However, the first electrode terminal 74 and the second electrode terminal 76 are not limited thereto. For example, the first electrode terminal 74 and the second electrode terminal 76 may be made by metal plate attachment to the first flange portion 24 and the second flange portion 26.

For example, a coated conducting wire or the like constitutes the coil 30 illustrated in FIG. 1. The conducting wire constituting the coil 30 may be a stranded wire or a single wire. As illustrated in FIG. 5, the coil 30 is wound in one layer around the winding core portion 22. Alternatively, the coil 30 may be wound in multiple layers around the winding core portion 22. In addition, the first end portion 34 and the second end portion 36 of the coil 30 are fixed by welding, soldering, or the like to the first electrode terminal 74 and the second electrode terminal 76.

Figure 3:
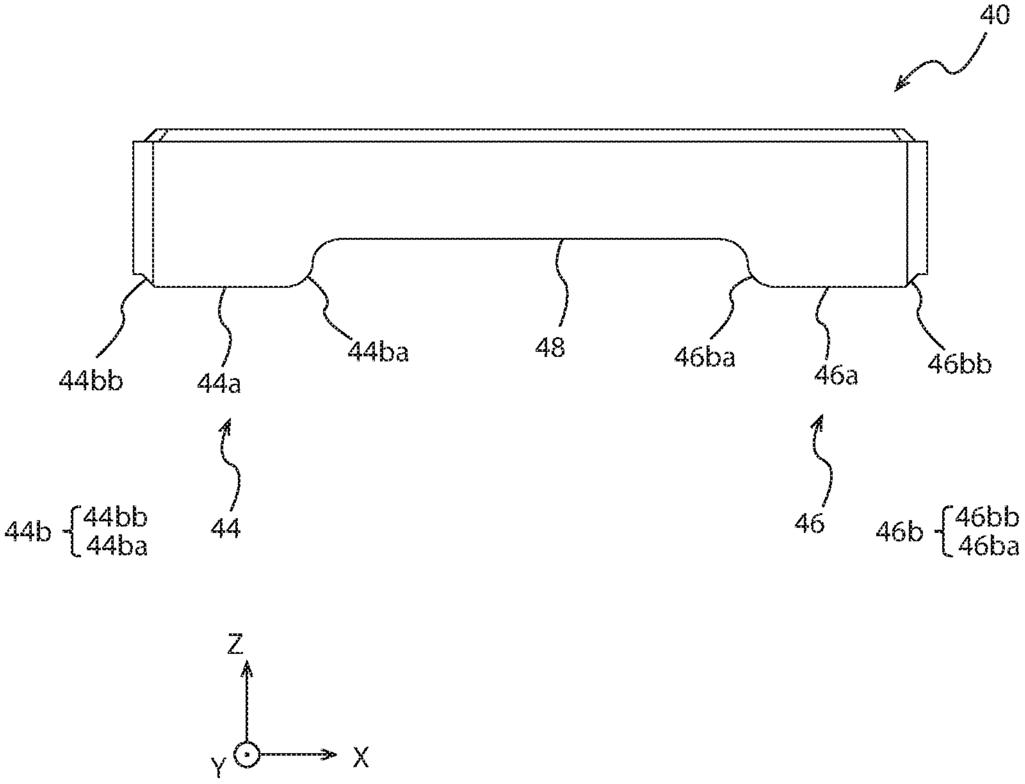
FIG. 3 is a front view of a plate core included in the coil device illustrated in FIG. 1.
Figure 4:
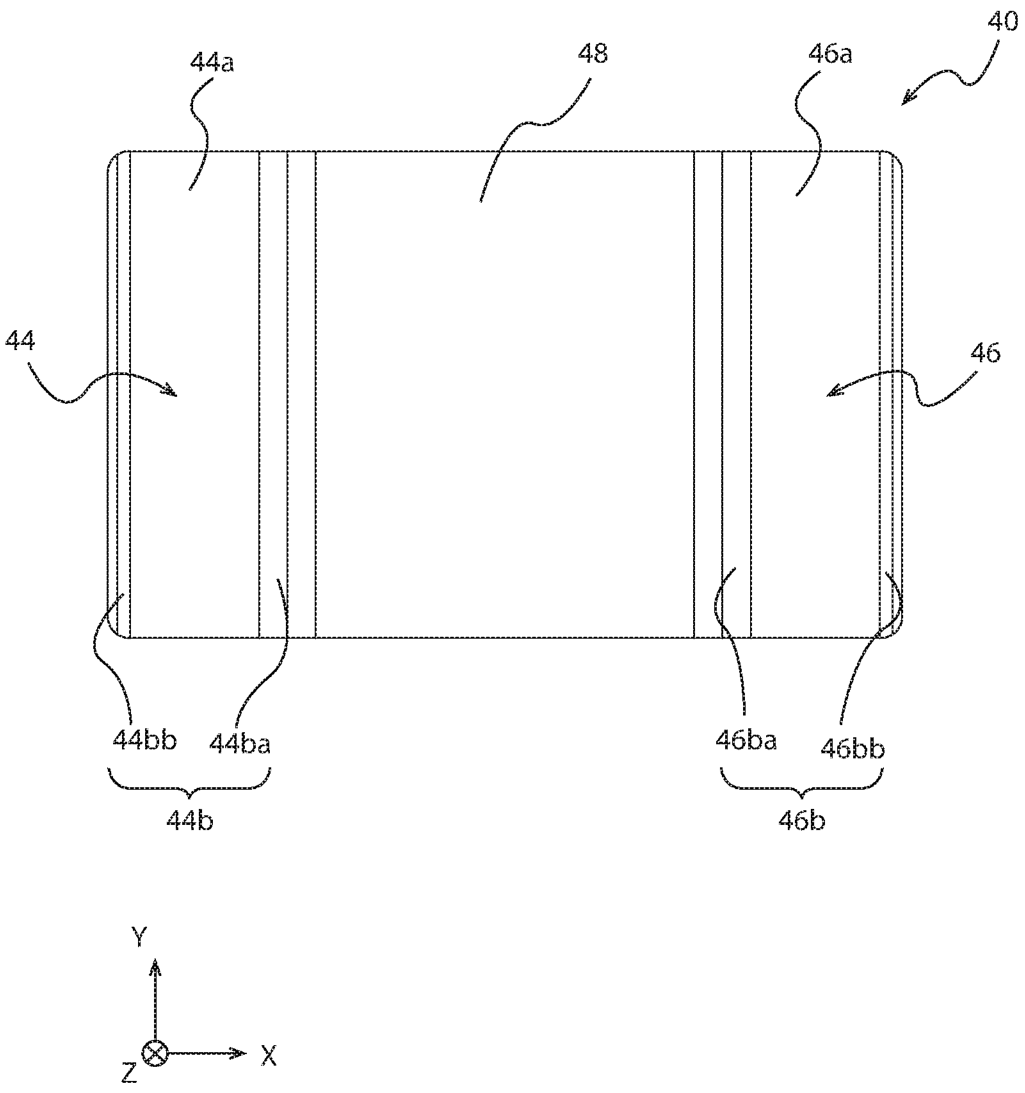
FIG. 4 is a bottom view of the plate core included in the coil device illustrated in FIG. 1.

FIG. 3 is a front view of the plate core 40 included in the coil device 10. FIG. 4 is a bottom view of the plate core 40. As illustrated in FIG. 3, the plate core 40 has a first projecting portion 44 and a second projecting portion 46. The first projecting portion 44 and the second projecting portion 46 are formed on the surface of the plate core 40 on the Z-axis negative direction side that faces the drum core 20. In addition, the first projecting portion 44 and the second projecting portion 46 are disposed on both sides of the plate core 40 in the X-axis direction (winding axis direction) and a recessed portion 48 is formed between the first projecting portion 44 and the second projecting portion 46. The recessed portion 48 is recessed to the Z-axis positive direction side with respect to the first projecting portion 44 and the second projecting portion 46.

As illustrated in FIG. 5, which is a cross-sectional view, the first projecting portion 44 protrudes toward the first flange surface 24*a* of the drum core 20. A first flat surface 44*a*, which is the tip surface of the first projecting portion 44, faces the first flange surface 24*a*. The second projecting portion 46 protrudes toward the second flange surface 26*a* of the drum core 20. A second flat surface 46*a*, which is the tip surface of the second projecting portion 46, faces the second flange surface 26*a*.

As illustrated in FIG. 5, the drum core 20 and the plate core 40 are bonded by the first flange surface 24*a* and the first flat surface 44*a* butting against each other and the second flange surface 26*a* and the second flat surface 46*a* butting against each other. The first cured-adhesive portion 64 is interposed between the first flange surface 24*a* and the first flat surface 44*a*. The second cured-adhesive portion 66 is interposed between the second flange surface 26*a* and the second flat surface 46*a*.

As illustrated in FIGS. 3 and 4, the first projecting portion 44 has a first wall surface 44*b* as well as the first flat surface 44*a* butting against the first flange surface 24*a*. The first wall surface 44*b* extends in an obliquely upward direction or an upward direction (Z-axis positive direction), which is a direction away from the first flange surface 24*a* from the first flat surface 44*a*. The first wall surface 44*b* has a first inner wall surface 44*ba* and a first outer wall surface 44*bb*. The first inner wall surface 44*ba* is connected to the first flat surface 44*a* on a side close to the second flat surface 46*a* (X-axis positive direction side). The first outer wall surface 44*bb* is connected to the first flat surface 44*a* on a side far from the second flat surface 46*a* (X-axis negative direction side).

In addition, the second projecting portion 46 has a second wall surface 46*b* as well as the second flat surface 46*a* butting against the second flange surface 26*a*. The second wall surface 46*b* extends in an obliquely upward direction or an upward direction (Z-axis positive direction), which is a direction away from the second flange surface 26*a* from the second flat surface 46*a*. The second wall surface 46*b* has a second inner wall surface 46*ba* and a second outer wall surface 46*bb*. The second inner wall surface 46*ba* is connected to the second flat surface 46*a* on a side close to the first flat surface 44*a* (X-axis negative direction side). The second outer wall surface 46*bb* is connected to the second flat surface 46*a* on a side far from the first flat surface 44*a* (X-axis positive direction side).

As illustrated in FIG. 3, the first inner wall surface 44*ba* and the second inner wall surface 46*ba* are curved surfaces inclined to the center side of the plate core 40 in the winding axis direction (X-axis direction) and the first outer wall surface 44*bb* and the second outer wall surface 46*bb* are flat surfaces inclined to the outside of the plate core 40 in the winding axis direction (X-axis direction). The first inner wall surface 44*ba* and the second inner wall surface 46*ba* are connected by the recessed portion 48.

Figure 6:
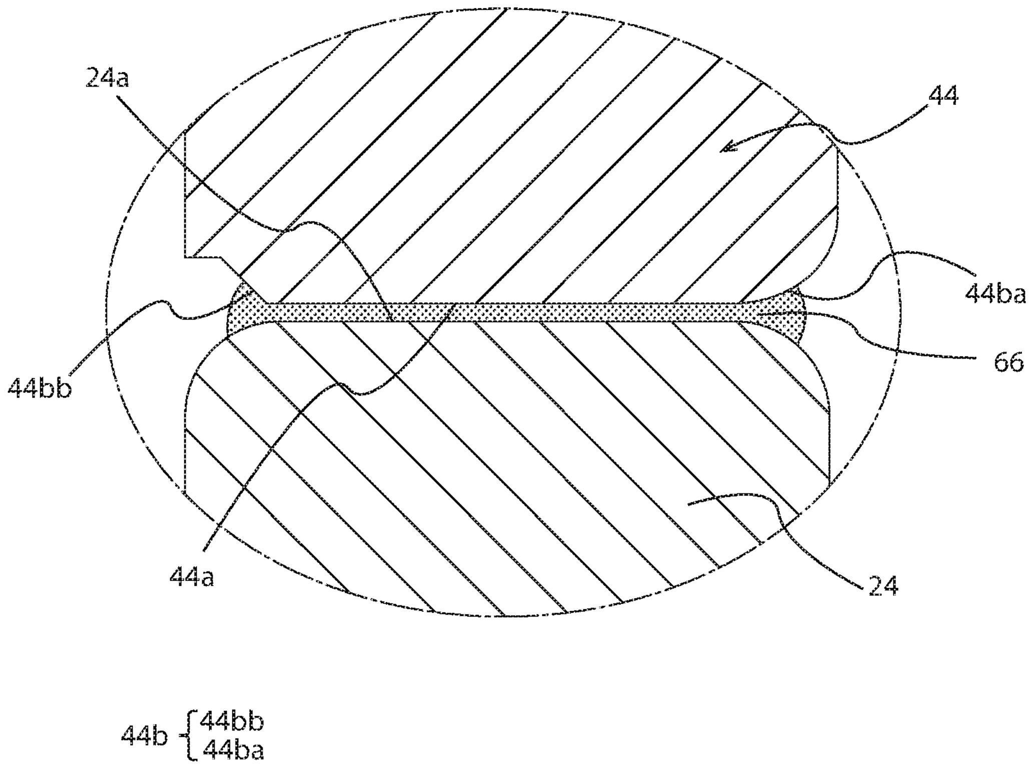
FIG. 6 is a partially enlarged cross-sectional view in which a part of FIG. 5 is enlarged.

As illustrated in FIG. 6, in which a part of FIG. 5 is enlarged, the first cured-adhesive portion 64 bonding the first flange surface 24*a* and the first flat surface 44*a* protrudes from the first flat surface 44*a* and is in contact with the first wall surface 44*b*. In other words, the part of the first cured-adhesive portion 64 that protrudes from the first flat surface 44*a* to the center side of the plate core 40 is in contact with the first inner wall surface 44*ba*. In addition, the part of the first cured-adhesive portion 64 that protrudes from the first flat surface 44*a* to the outside of the plate core 40 is in contact with the first outer wall surface 44*bb*.

As illustrated in FIG. 5, the second cured-adhesive portion 66 bonding the second flange surface 26*a* and the second flat surface 46*a* protrudes from the second flat surface 46*a* and is in contact with the second wall surface 46*b* as in the case of the first cured-adhesive portion 64. In other words, the part of the second cured-adhesive portion 66 that protrudes from the second flat surface 46*a* to the center side of the plate core 40 is in contact with the second inner wall surface 46*ba*. In addition, the part of the second cured-adhesive portion 66 that protrudes from the second flat surface 46*a* to the outside of the plate core 40 is in contact with the second outer wall surface 46*bb*.

Here, by the plate core 40 having the first projecting portion 44 and the second projecting portion 46 as illustrated in FIGS. 3 and 4, the surface of the plate core 40 that faces the drum core 20 tends not only to increase in surface area but also to form a partially dense surface. In other words, the plate core 40 as illustrated in FIG. 3 is molded by means of a press mold moving in the Z-axis direction, which is the thickness direction of the plate core, and thus the first wall surface 44*b* and the second wall surface 46*b* not parallel to the first flat surface 44*a* and the second flat surface 46*a* tend to form a surface where the material constituting the core is densely disposed as compared with the first flat surface 44*a* and the second flat surface 46*a* orthogonal to the Z-axis direction.

In addition, of the first wall surface 44*b* and the second wall surface 46*b*, the first inner wall surface 44*ba* and the second inner wall surface 46*ba* close to the thin recessed portion 48 tend to be surfaces where the material is densely disposed as compared with the first outer wall surface 44*bb* and the second outer wall surface 46*bb*. It is conceivable that the density of such a surface is because the amount of movement of particles in the press mold increases in the direction of movement of the press mold and at a thin part and decreases in the direction perpendicular to the direction of movement of the press mold and at a thick part.

In the coil device 10, the first projecting portion 44 and the second projecting portion 46 are provided at the part of bonding to the drum core 20 in the plate core 40. As a result, a dense surface satisfactorily bondable to the first and second cured-adhesive portions 64 and 66 illustrated in FIG. 5 is disposed on the first projecting portion 44 and the second projecting portion 46. Accordingly, the coil device 10 in which the first and second cured-adhesive portions 64 and 66 are interposed between the first and second projecting portions 44 and 46 and the first and second flange surfaces 24*a* and 26*a* is satisfactory in terms of the bonding strength between the plate core 40 and the drum core 20.

In addition, the first and second cured-adhesive portions 64 and 66 are in contact with the first wall surface 44*b* and the second wall surface 46*b*, where the dense surface formation tendency is particularly strong in the first projecting portion 44 and the second projecting portion 46, and thus the bonding strength between the plate core 40 and the drum core 20 is further improved. It should be noted that providing the first projecting portion 44 and the second projecting portion 46 is particularly effective for bonding strength improvement between the plate core 40 and the drum core 20 in a case where the plate core 40 is a metal core or an alloy core.

In other words, the surface of the metal core or the alloy core tends to be rougher than the surface of a ferrite core such as sintered ferrite due to, for example, a large binder amount of the formed body. Adhesive application to the rough metal or alloy core surface may result in a rapid removal of the solvent component of the adhesive from the surface, and then the strength of bonding by the cured-adhesive portion may be adversely affected. However, in the plate core 40 of the coil device 10, the dense surface is formed on the first projecting portion 44 and the second projecting portion 46, and thus the loss of the solvent component of the adhesive during adhesion is suppressed and the first and second cured-adhesive portions 64 and 66 exhibit suitable bonding strength.

Although the invention has been described with reference to the embodiment as described above, it is a matter of course that the invention is not limited to the above-described embodiment and includes many other embodiments, examples, and modification examples. For example, the first wall surface 44*b* and the second wall surface 46*b* of the first projecting portion 44 and the second projecting portion 46 may extend in the upward direction (Z-axis positive direction) perpendicularly to the first flat surface 44*a* and the second flat surface 46*a* instead of being inclined surfaces extending obliquely upward from the first flat surface 44*a* and the second flat surface 46*a* as illustrated in FIG. 3.

Figure 7:
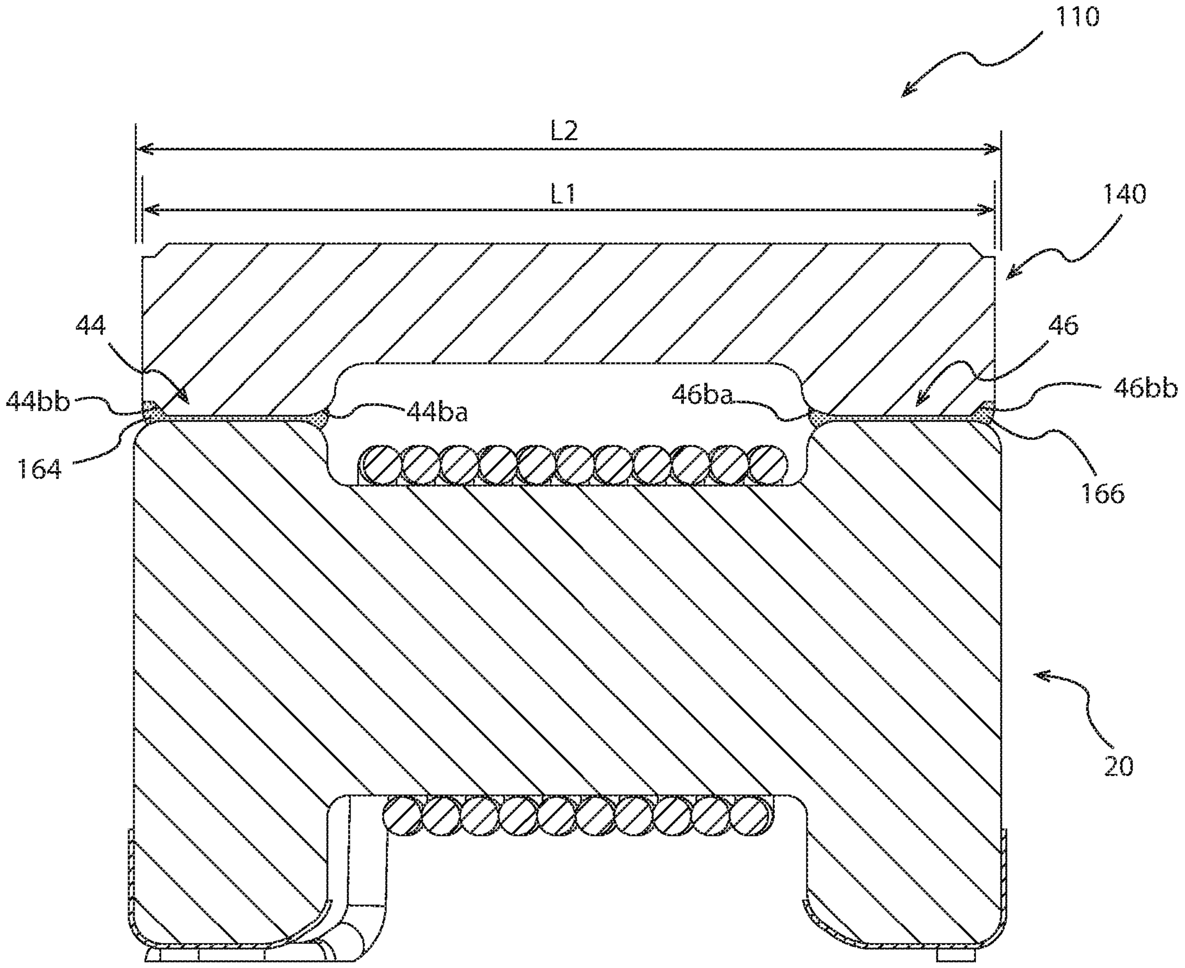
FIG. 7 is a cross-sectional view of a coil device according to another embodiment of the invention.

In addition, although the length of the plate core 40 along the winding axis direction (X-axis direction) is the same as the length of the drum core 20 along the winding axis direction in the coil device 10 illustrated in FIG. 1, the plate core 40 and the drum core 20 may have different lengths. FIG. 7 is a cross-sectional view of a coil device 110 according to another embodiment. The coil device 110 differs from the coil device 10 according to the first embodiment in that a length L1 of a plate core 140 along the winding axis direction is shorter than a length L2 of the drum core 20 along the winding axis direction.

In the coil device 110 illustrated in FIG. 7, the entire first outer wall surface 44*bb* and the entire second outer wall surface 46*bb* are coated with a first cured-adhesive portion 164 and a second cured-adhesive portion 166, respectively. In this manner, in the coil device 110, the first cured-adhesive portion 164 and the second cured-adhesive portion 166 spread to the vicinity of the outside surface of the plate core 140 and the bonding strength between the plate core 140 and the drum core 20 is satisfactory.

In addition, the length L1 of the plate core 140 is shorter than the length L2 of the drum core 20 in the coil device 110. Accordingly, protrusion to the outside of the drum core 20 longer than the plate core 140 is prevented even if the first cured-adhesive portion 164 and the second cured-adhesive portion 166 protrude to the outside of the plate core 140. Accordingly, with the coil device 110, it is possible to improve the bondability between the plate core 140 and the drum core 20 while suppressing external dimensional deviation. The other features and effects of the coil device 110 are similar to those of the coil device 10.

10,110:coil device
20: drum core
22: winding core portion
24: first flange portion
24*a*: first flange surface
24*b*,26*b*: flange lower surface
26: second flange portion
26*a*: second flange surface
30: coil
34: first end portion
36: second end portion
40, 140: plate core
44: first projecting portion
44*a*: first flat surface
44*b*: first wall surface
44*ba*: first inner wall surface
44*bb*: first outer wall surface
46: second projecting portion
46*a*: second flat surface
46*b*: second wall surface
46*ba*: second inner wall surface
46*bb*: second outer wall surface
48: recessed portion
64,164: first cured-adhesive portion
66,166: second cured-adhesive portion
74: first electrode terminal
76: second electrode terminal

What is claimed is:

1. A coil device comprising:
a drum core, the drum core comprising:
a first flange portion having a first flange surface;
a second flange portion having a second flange surface; and
a winding core portion disposed between the first and second flange portions;
a coil wound around the winding core portion;
a plate core connected to the first flange surface at a first direction side and the second flange surface at the first direction side, the plate core comprising:
a first projecting portion protruding toward the first flange surface and having a first flat surface facing the first flange surface;
a second projecting portion protruding toward the second flange surface and having a second flat surface facing the second flange surface;
a first wall surface extending from the first flat surface in a direction away from the first flange surface, the first wall surface having a first inner wall surface extending from the first flat surface at a side close to the second flat surface; and
a second wall surface extending from the second flat surface in a direction away from the second flange surface, the second wall surface having a second inner wall surface extending from the second flat surface at a side close to the first flat surface;
a first electrode terminal provided on the first flange portion, one end portion of the coil being electrically connected on the first electrode terminal;
a second electrode terminal provided on the second flange portion, another end portion of the coil being electrically connected on the second electrode terminal;
a first cured-adhesive portion bonding the first flange surface and the first flat surface that is also in contact with the first wall surface, the first cured-adhesive portion being in contact with the first inner wall surface; and
a second cured-adhesive portion bonding the second flange surface and the second flat surface that is also in contact with the second wall surface, the second cured-adhesive portion being in contact with the second inner wall surface,
wherein the drum core and the plate core are connected by abutting and bonding the first flange surface against the first flat surface and by abutting and bonding the second flange surface against the second flat surface.

2. The coil device according to claim 1, wherein the plate core includes metal particles.

3. The coil device according to claim 2, wherein the drum core is a ferrite core.

4. The coil device according to claim 1, wherein a length of the plate core is shorter than a length of the drum core along a winding axis direction.

* * * * *